United States Patent
Chen et al.

(10) Patent No.: US 8,166,756 B2
(45) Date of Patent: May 1, 2012

(54) TURBINE INTAKE PRESSURE RELEASE STRUCTURE

(75) Inventors: Jung-Chun Chen, Taipei County (TW); Chun-I Wu, Yunlin County (TW); Pai-Hsiu Lu, Taoyuan County (TW); Chen-Wei Wu, Taoyuan County (TW)

(73) Assignee: China Engine Corporation, Tayuan Hsiang, Taoyuan Hsien (TW)

( * ) Notice: Subject to any disclaimer, the term of this patent is extended or adjusted under 35 U.S.C. 154(b) by 620 days.

(21) Appl. No.: 12/425,940

(22) Filed: Apr. 17, 2009

(65) Prior Publication Data
US 2010/0263371 A1 Oct. 21, 2010

(51) Int. Cl.
*F02D 23/00* (2006.01)
(52) U.S. Cl. .............................. 60/602; 60/603; 415/144
(58) Field of Classification Search .................... 60/602, 60/603, 600, 601; 415/144; *F02D 23/00*
See application file for complete search history.

(56) References Cited

U.S. PATENT DOCUMENTS

| | | | | |
|---|---|---|---|---|
| 4,461,149 A | * | 7/1984 | Suzuki | ............................ 60/602 |
| 7,210,295 B2 | * | 5/2007 | McEwen | ....................... 415/144 |
| 2003/0115870 A1 | * | 6/2003 | Finger et al. | ..................... 60/602 |

* cited by examiner

*Primary Examiner* — Quyen Leung
*Assistant Examiner* — Michael Andrews
(74) *Attorney, Agent, or Firm* — Muncy, Geissler, Olds & Lowe, PLLC

(57) ABSTRACT

A turbine intake pressure release structure to control pressure release between a throttle and a first turbine boosted pressure outlet includes a pressure release valve which has a first pressure orifice, a second pressure orifice and a housing chamber, at least one controller which has a pressure detection end and a driven portion and a switch duct which has a first end opening, a second end opening and a third end opening. The first end opening is connected to a third turbine boosted pressure outlet. The second end opening leads to the atmosphere. The third end opening is connected to the second pressure orifice. The driven portion runs through the switch duct to close the second end opening through the driven portion drive a membrane to a first position or closes the first end opening through the driven portion to drive the membrane to a second position.

6 Claims, 2 Drawing Sheets

TURBINE INTAKE PRESSURE RELEASE STRUCTURE

FIELD OF THE INVENTION

The present invention relates to a turbine intake pressure release structure and particularly to a structure to release pressure of turbine intake air.

BACKGROUND OF THE INVENTION

In a turbine booster system, intake air pressure release is an important issue. During turbine operation, the turbine drives a compressor to form high pressure air which is channeled through an intake passage to pass through a throttle to enter a manifold of an engine. The throttle (also called accelerator) is controlled by a spring. The throttle is closed when the accelerator not is being stepped by a driver. The high pressure air from the turbine is trapped in the intake passage in front of the throttle. When a pedal of the accelerator is stepped by the driver, an accelerator wire draws the throttle spring to open the throttle to allow the high pressure air to enter the engine. When the turbine is in high speed operation and closed abruptly (such as stopping fuel supply by releasing the throttle to perform deceleration or shifting), the pressure between the compressor outlet and throttle increases tremendously and instantly. As the exit pressure of the turbine has no way to escape, it is accumulated in front of the throttle and forms a great instantaneous pressure on the bearing and results in drastic wearing. The compressor also could be damaged, and the main shaft could even be broken. The accumulated pressure has to be released properly. This has to rely on a pressure release process.

The common approach adopted in the conventional technique is bridging the throttle and compressor outlet with an intake pressure release valve. The intake pressure release valve includes at least one spring, a membrane and a bypass channel. The intake pressure release valve has one end to receive boosted outlet pressure of the turbine and the other end connecting to a vacuum duct controlled by the manifold vacuum. When the accelerator is stepped and the throttle is opened, a positive pressure is formed in the vacuum duct to push the intake pressure release valve in a direction such that the spring pushes the membrane to close the bypass channel, the boosted pressure fully enters the engine. When the accelerator is released, the throttle is closed, and the vacuum duct become a negative pressure instantly to attract the membrane, and to bypass the pressure in front of the throttle. The aforesaid structure still has problems, such as vacuum establishing speed in the vacuum duct is too slow. A delay occurs to the reaction speed of the membrane of the intake pressure release valve. And the pressure in the compressor generates vibration in the intake passage and produces noise. On the other hand, if the spring of the intake pressure release valve is not properly chosen, the elasticity coefficient (K value) of the spring is too big, then the negative pressure in the vacuum duct cannot produce enough absorption and pressure release cannot be accomplished. Turbine damage could occur, or pressure release deficiency takes places and results in noise generation in the intake passage.

SUMMARY OF THE INVENTION

The primary object of the present invention is to solve the problems of the conventional technique of adopting the vacuum duct to control intake pressure release valve that requires time to establish vacuum of the manifold and incurs slower response of the membrane of the intake pressure release valve that results in noise generation during intake pressure releasing. It also aims to overcome another conventional problem of adopting the spring that needs more time to design, fabricate and test to get optimum elasticity coefficient to avoid noise generation.

To achieve the foregoing object, the present invention provides a turbine intake pressure release structure to control pressure release between a throttle and a first turbine boosted pressure outlet. At least one membrane is provided and driven by the throttle to form a first position while the throttle is opened and a second position when the throttle is closed. The turbine intake pressure release structure also includes a pressure release valve which has a first pressure orifice, a second pressure orifice and a housing chamber, at least one controller which has a pressure detection end and a driven portion, and a switch duct which has a first end opening, a second end opening and a third end opening. The first pressure orifice is connected to a second turbine boosted pressure outlet. The membrane is held in the housing chamber. The pressure detection end is connected to the throttle. When the pressure detection end detects the opening and closing of the throttle, the driven portion is respectively controlled to generate a first action and a second action. The first end opening is connected to a third turbine boosted pressure outlet. The second end opening leads to the atmosphere. The third end opening is connected to the second pressure orifice. The driven portion runs through the switch duct and closes the second end opening through the first action to maintain communication between the first end opening and the third end opening, thereby to drive the membrane to form the first position. The driven portion closes the first end opening in the second action to maintain communication between the second end opening and the third end opening to drive the membrane to form the second position.

By means of the structure set forth above, compared with the conventional technique that adopts the spring mechanism and vacuum control, the membrane of the intake pressure release valve reacts much faster and effective, and also can result in lower vibration noise during intake pressure release. Time required to design and fabricate the turbine engine with less vibration noise also can be shortened.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
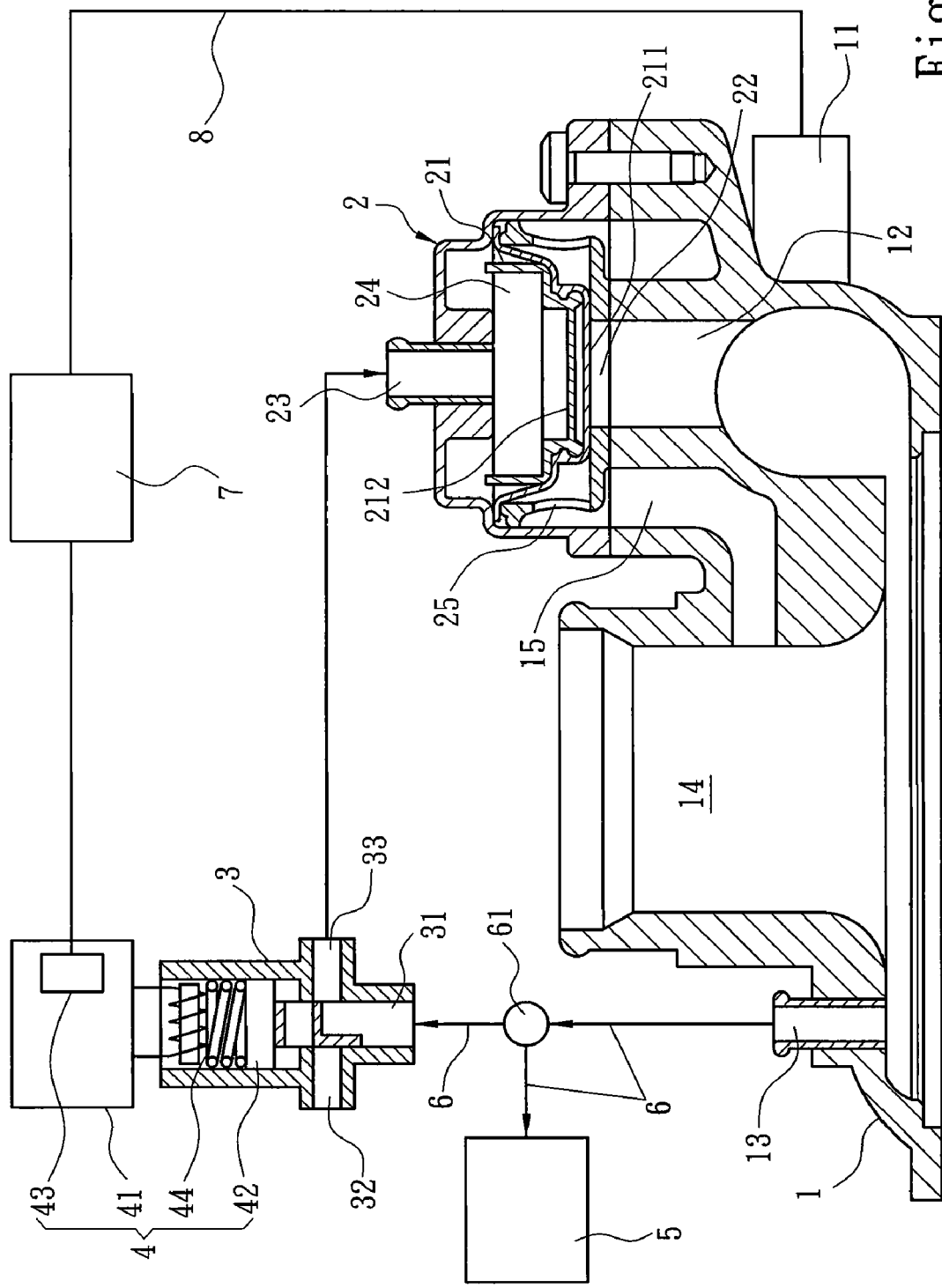
FIG. 1 is a schematic view of the invention showing the accelerator stepped for acceleration.

Please refer to FIG. 1 for a schematic view of the invention for an accelerator being stepped for acceleration. The turbine intake pressure release structure according to the invention aims to control release of pressure in an air intake passage 8 (the actual airflow piping is longer, as it is not the main focus of the invention, the airflow piping is represented by the air intake passage 8 in the drawing) between a throttle 7 and a first turbine boosted pressure outlet 11. FIG. 1 also shows a compressor casing 1 of a turbine pressure booster. The compressor casing 1, in addition to the first turbine boosted pressure outlet 11, also has a second turbine boosted pressure outlet 12, a third turbine boosted pressure outlet 13, an turbine intake end 14 and at least one bypass channel 15 to release pressure. The second turbine boosted pressure outlet 12 is connected to a first pressure orifice 22 of a pressure release valve 2. The pressure release valve 2 further has a second pressure orifice 23, a membrane 21 held in a housing chamber 24 and a bypass channel 25. The membrane 21 has a first area 211 and a second area 212 on another side corresponding to the first area 211 formed at a size greater than the first area 211. The first area 211 is big enough to close the first pressure orifice 22. The second area 212 is big enough to close the second pressure orifice 23. The second pressure orifice 23 is connected to a third end opening 33 of a switch duct 3 through a high pressure duct 6. The switch duct 3 further has a first end opening 31 and a second end opening 32. The first end opening 31, second end opening 32 and third end opening 33 communicate with each other. The second end opening 32 leads to the atmosphere, i.e. external air. The first end opening 31 is connected to a branch element 61 through the high pressure duct 6 to channel the pressure of the third turbine boosted pressure outlet 13 supplied to a wastegate 5. The switch duct 3 is connected to at least one controller 4 which has a pressure detection end 41 and a driven portion 42. The pressure detection end 41 is connected to the throttle 7 through a sensor 43. When the accelerator is stepped for acceleration, the sensor 43 detects opening of the throttle 7, and the controller 4 drives the driven portion 42 through a driving portion 44 to generate a first action so that the driven portion 42 run through the switch duct 3 closes the second end opening 32 to maintain communication of the first end opening 31 and the third end opening 33. Thereby the boosted pressure at the third turbine boosted pressure outlet 13 is channeled to the second pressure orifice 23; as the first pressure orifice 22 is connected to the second turbine boosted pressure outlet 12, the first and second pressure orifices 22 and 23 receive the boosted pressure from the turbine. Since the second area 212 of the membrane 21 is bigger than the first area 211, given the same pressure source, the membrane 21 is pushed to the first position to close the second turbine boosted pressure outlet 12 so that the boosted pressure of the turbine is channeled from the first turbine boosted pressure outlet 11 to the throttle 7 and enters the engine.

Figure 2:
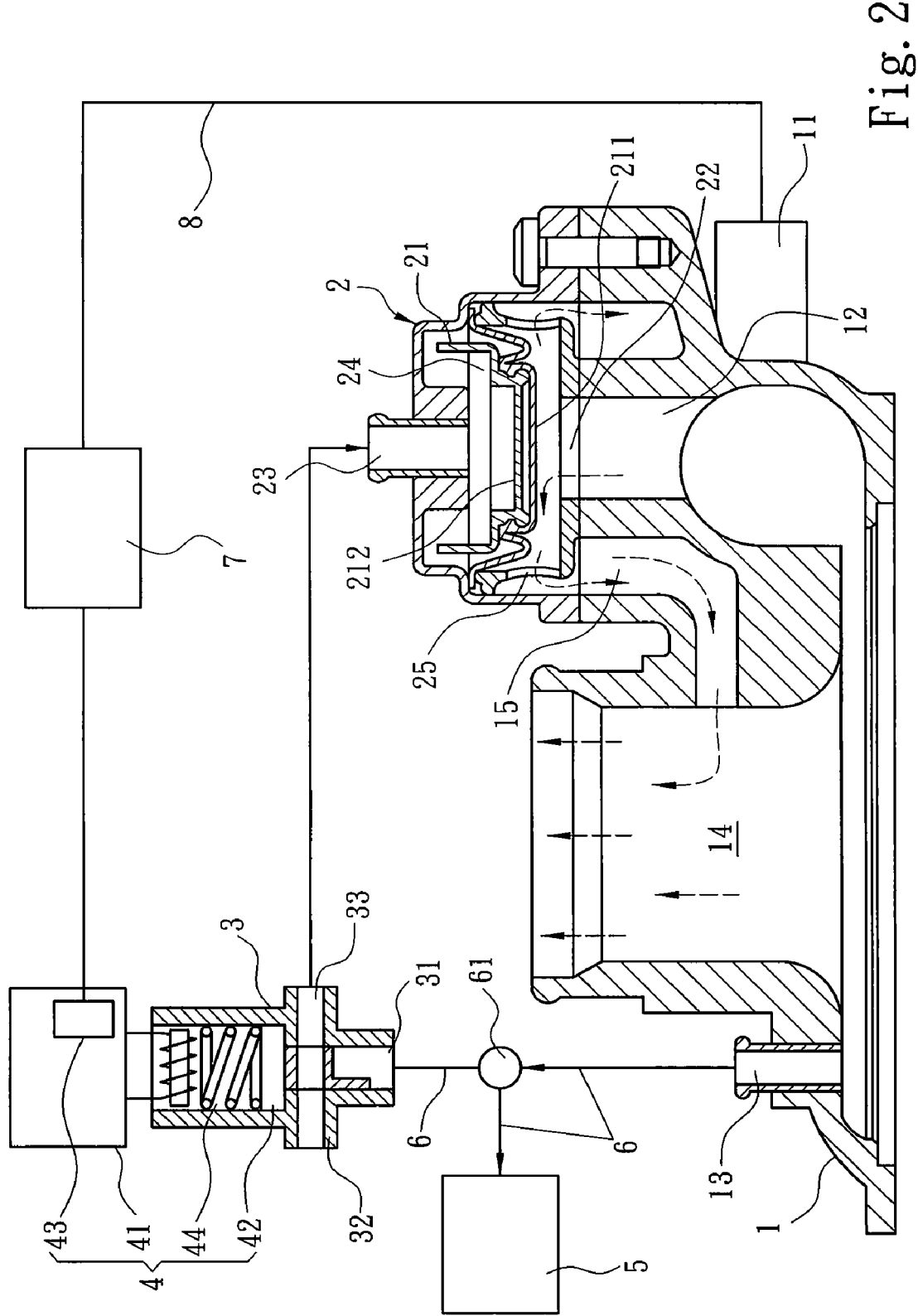
FIG. 2 is a schematic view of the invention showing the accelerator released for deceleration.

Refer to FIG. 2 for a schematic view of the invention for an accelerator being stepped for deceleration. The connection structure of the turbine intake pressure release structure is the same as that of the FIG. 1. However the action of driving the membrane 21 of the pressure release valve 2 is different. When the accelerator is released for deceleration or shifting, the sensor 43 detects opening of the throttle 7, the controller 4 drives the driven portion 42 through the driving portion 44 to generate a second action. The driven portion 42 closes the first end opening 31 and maintains communication of the second end opening 32 and the third end opening 33. The second end opening 32 channels atmosphere to the second pressure orifice 23. Meanwhile, the first pressure orifice 22 is still connected to the pressure of the second turbine boosted pressure outlet 12. As the boosted pressure of the turbine is greater than the atmospheric pressure, through such a pressure difference principle, pushing the membrane 21 moved from the second turbine boosted pressure outlet 12 to a second position so that the instantaneous pressure accumulated between the throttle 7 and the first turbine boosted pressure outlet 11 during throttling is released through the bypass channel of the pressure release valve 2. The release pressure is directed to the bypass channel 15 of the turbine casing 1 and channels to the turbine intake end 14 to be used again in a recycling fashion. In short, the present invention provides a main feature that uses the boosted pressure of the turbine boosted pressure outlet to incorporate with an electronic controller of a vehicle to control pressure release operation of the pressure release valve 2 so that the membrane 21 can move quickly and is more responsive, thereby noise generated by intake pressure release can be reduced. It provides a significant improvement over the conventional technique.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A turbine intake pressure release structure to control release of pressure between a throttle and a first turbine boosted pressure outlet with the throttle opened to drive at least one membrane to a first position and the throttle closed to drive the membrane to a second position, comprising:
   a pressure release valve which has a first pressure orifice, a second pressure orifice and a housing chamber to hold the membrane, the first pressure orifice connecting to a second turbine boosted pressure outlet;
   at least one controller which has a pressure detection end and a driven portion, the pressure detection end being connected to and communicating with the throttle and detecting the opening and closing of the throttle to respectively control the driven portion to generate a first action and a second action; and
   a switch duct which has a first end opening, a second end opening and a third end opening that communicate with each other, the first end opening being connected to and communicating with a third turbine boosted pressure outlet, the second end opening leading to the atmosphere, the third end opening being connected to and communicating with the second pressure orifice; the driven portion running through the switch duct to close the second end opening through the first action of the driven portion to maintain communication of the first end opening and the third end opening to drive the membrane to the first position; the second action of the driven portion closing the first end opening to maintain communication of the second end opening and the third end opening to drive the membrane to the second position.

2. The turbine intake pressure release structure of claim 1, wherein the membrane has a first area and a second area formed on another side corresponding to the first area at a size greater than the first area.

3. The turbine intake pressure release structure of claim 2, wherein the first area is adequate to close the first pressure orifice and the second area is adequate to close the second pressure orifice.

4. The turbine intake pressure release structure of claim 1, wherein the pressure release valve has at least one bypass channel to release the pressure.

5. The turbine intake pressure release structure of claim 1, wherein the second pressure orifice is connected to the third end opening through a high pressure duct.

6. The turbine intake pressure release structure of claim 1, wherein the first end opening is connected to the third turbine boosted pressure outlet through a high pressure duct.

* * * * *